United States Patent

Vickland

[15] 3,677,011
[45] July 18, 1972

[54] THRUST CONTROL SYSTEM FOR HYBRID ROCKET MOTORS

[72] Inventor: Clayton W. Vickland, San Jose, Calif.
[73] Assignee: The United States of America as represented by the Secretary of the Air Force
[22] Filed: Jan. 22, 1969
[21] Appl. No.: 793,195

[52] U.S. Cl. ................................60/251, 60/220
[51] Int. Cl. .........................................F02k 9/06
[58] Field of Search ......................60/233, 234, 251

[56] References Cited

UNITED STATES PATENTS 3,315,472  4/1967  Moutet et al. ..............................60/251
3,368,353  2/1968  Allport ......................................60/240

Primary Examiner—Samuel Feinberg
Attorney—Harry A. Herbert, Jr. and Richard J. Killoren

[57] ABSTRACT

A high specific impulse rocket motor having the impulse delivered at two thrust levels with restart capability has oxidizer supplied to an aft injector and to a plurality of primary injectors located within the forward ends of a plurality of fuel grain ports. The flow of oxidizer is controlled by two solenoid valves which control the sustain flow and the boost flow of oxidizer. Poppet valves are provided in the primary injectors and the aft injector and are opened by the pressure of the oxidizer delivered through the sustain system.

2 Claims, 3 Drawing Figures

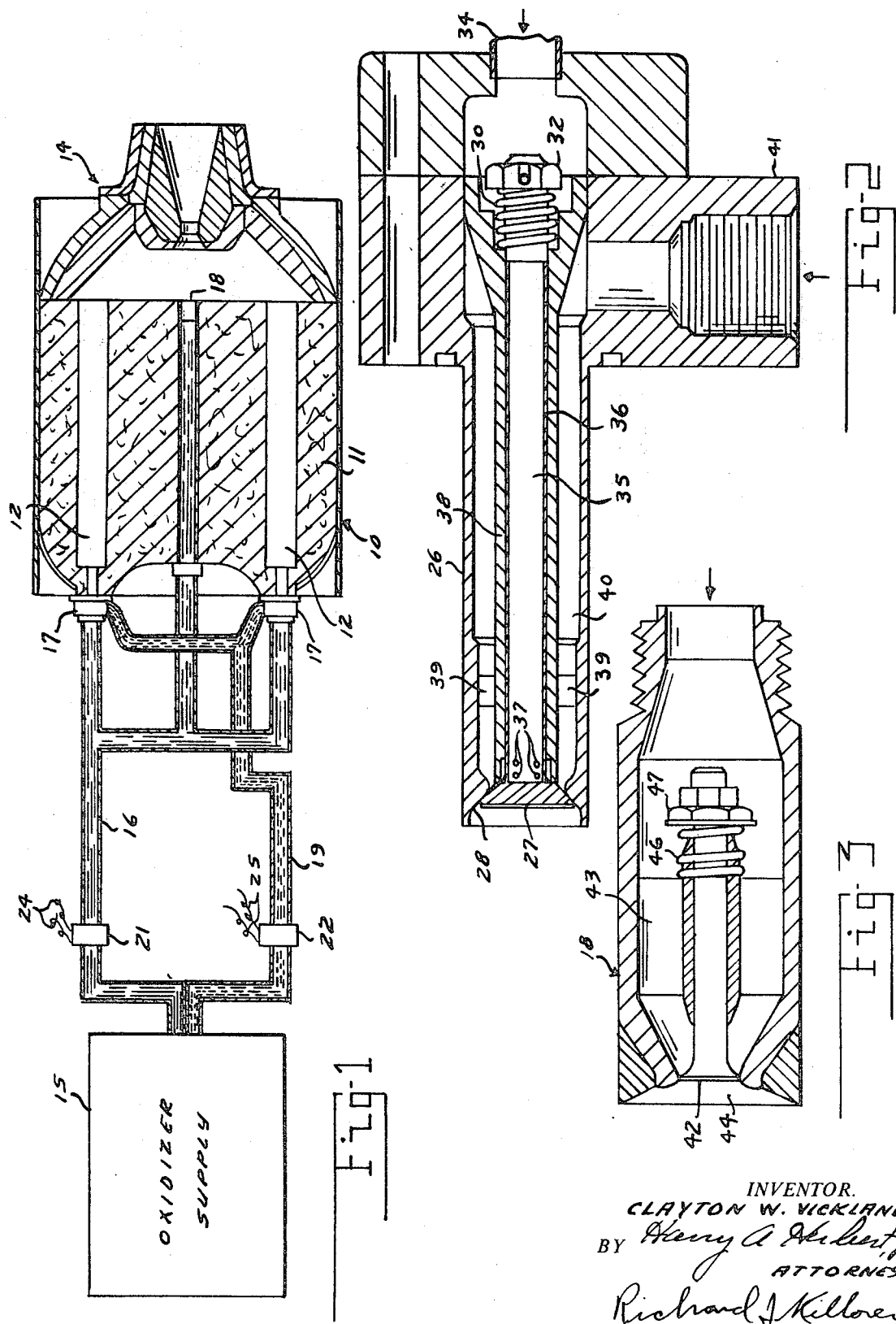

THRUST CONTROL SYSTEM FOR HYBRID ROCKET MOTORS

BACKGROUND OF THE INVENTION

For some tactical missile requirements, it is desirable to provide high specific impulse rocket motors with the impulse to be delivered at two thrust levels with the capability of restart after short coasting periods. With multiple restarting, back flow of fuel rich gases into the injector must be prevented since the reaction between the fuel and oxidizer on restarting would result in injector failure.

SUMMARY OF THE INVENTION

According to this invention, a pair of solenoid valves control the flow of oxidizer to a plurality of primary injectors and an aft injector. One solenoid controls the sustain thrust flow of oxidizer to the primary injectors and the aft injector. The second solenoid controls the boost flow of oxidizer to the primary injectors. The flow, from the injectors, is controlled by poppet valves which are opened in response to sustain oxidizer flow.

BRIEF DESCRIPTION OF THE DRAWING

FIG. 1 is a schematic diagram, partially in section, of a hybrid rocket thrust control system of the invention;
FIG. 2 is a sectional view of one of the primary injectors for the device of FIG. 1; and
FIG. 3 is a sectional view of the aft injector for the device of FIG. 1.

DESCRIPTION OF THE PREFERRED EMBODIMENT

Reference is now made to FIG. 1 of the drawing which shows a hybrid rocket 10 having fuel grain 11 with a plurality of fuel grain ports 12 and a nozzle 14. Oxidizer material at about 1,100 psi is supplied to the ports 12 from an oxidizer supply 15 through sustain line 16 to primary injectors 17 and an aft injector 18. Oxidizer is also supplied to primary injectors 17 through boost line 19. Solenoid valves 21 and 22 control the flow of oxidizer to the primary injectors and aft injector through the sustain line 16 and boost line 19, by means of signals supplied to solenoid valves 21 and 22 over leads 24 and 25. The primary injectors 17, shown in greater detail in FIG. 2, each have a housing 26 and a poppet valve 27 which is retained against seat 28 by means of a spring 30. The travel of poppet valve 27 is limited by a nut 32. Sustain oxidizer is supplied at inlet 34 and passes through central passage 35 in valve shaft 36 and out through ports 37. The pressure of the oxidizer in the sustain line 16 acts to move the shaft 36 within the sleeve 38 and to open the poppet valve 27 when solenoid 21 is operated. The sleeve is supported within housing 26 by vanes 39. When boost solenoid 22 is operated, oxidizer is supplied to the boost inlet 41 through channel 40, vanes 39 and through open poppet valve 27. The aft injector 18, shown in greater detail in FIG. 3, has a poppet valve 42 which is supported on support vanes 43 through which the oxidizer passes to reach injector nozzle 44. The valve 42 is retained in its closed position by spring 46 and nut 47. The poppet valve 42 is operated by sustain oxidizer pressure in the same manner as the valve 27.

In one propulsion system having dual thrust capability of 2,500 lbs sustain thrust and 5,000 lbs boost thrust and designed with a sustain thrust chamber pressure of 500 psi and a boost thrust chamber pressure of 1,000 psi and with oxidizer supplied to the poppet valves at approximately 1,100 psi, the system differential pressure at sustain thrust is approximately 600 psi and at boost thrust is approximately 100 psi. All of the injectors used are of the fixed area orifice type so that as a result of changes in operating pressures the flow rate through the injectors will change with a change in differential pressure. The system was designed to deliver oxidizer at the following flow rates:

| Primary Injector | Sustain Thrust lbs/sec | Boost Thrust lbs/sec |
| --- | --- | --- |
| Sustain Orifice | 2.42 | .99 |
| Boost Orifice | 0 | 10.4 |
| Aft Injector | 4.12 | 1.68 |
| TOTAL | 6.54 | 13.07 |

Various propellant fuels and oxidizers may be used; however the fuel used must deliver a relatively high specific impulse, it must not sustain combustion on termination of oxidizer flow and should provide smooth and reproducible hypergolic ignition and efficient combustion. An example of a fuel which might be used is 50 percent TFTA (Tetraformaltrisazine, $(C_4H_{12}N_6)$) in a 50 percent R-binder which has 80 percent carbon and 10 percent oxygen. The oxidizer blend used with this fuel may be 50% $ClF_3$ and 50% $ClO_3F$.

There is thus provided a thrust control system for a high specific impulse rocket motor, with the impulse to be delivered at two thrust levels and which is capable of restart after short coasting periods, which does not result in injector failure.

I claim:

1. A thrust control system for a hybrid rocket motor having a rearwardly directed nozzle and a rocket body with an oxidizer and a fuel grain for providing hypergolic ignition wherein the fuel grain contains a plurality of fuel grain ports, comprising an oxidizer supply, a plurality of primary oxidizer injectors with one primary injector located in the forward end of each of the fuel grain ports; an additional oxidizer injector located at the aft end of said fuel grain; means for supplying a sustain flow of high pressure oxidizer material from said oxidizer supply to said primary injectors and to the additional injector; solenoid valve means for controlling the sustain flow of oxidizer to said primary injectors and said additional injector; means within said primary injectors and said additional injector for permitting flow of oxidizer through said injectors only in response to the pressure of said sustain flow of oxidizer; means for supplying a boost flow of oxidizer to said primary injectors and solenoid valve means for controlling the boost flow of oxidizer to said primary injectors.

2. The device as recited in claim 1 wherein said means for permitting flow of oxidizer through the injectors are spring controlled poppet valves which open in response to sustain oxidizer pressure.

* * * * *